United States Patent [19]

Janotik

[11] 4,151,455

[45] Apr. 24, 1979

[54] DIVIDED HOUSING UNIPOLAR DYNAMOELECTRIC MACHINE

[75] Inventor: Adam M. Janotik, Grosse Ile, Mich.

[73] Assignee: Ford Motor Company, Dearborn, Mich.

[21] Appl. No.: 863,101

[22] Filed: Dec. 22, 1977

[51] Int. Cl.² ............................................. H02P 9/00
[52] U.S. Cl. ..................... 322/48; 310/178; 310/219
[58] Field of Search ................. 322/48; 310/178, 219; 318/253

[56] References Cited

U.S. PATENT DOCUMENTS

| | | | |
|---|---|---|---|
| 1,635,319 | 7/1927 | Gill et al. | 322/48 |
| 3,211,936 | 10/1965 | Harvey | 310/219 X |
| 3,854,065 | 12/1974 | Rioux et al. | 310/219 |
| 3,989,968 | 11/1976 | Hatch | 310/219 |
| 4,071,795 | 1/1978 | Dobbing et al. | 310/219 |

*Primary Examiner*—Donovan F. Duggan
*Attorney, Agent, or Firm*—Robert W. Brown; Clifford L. Sadler

[57] ABSTRACT

A unipolar dynamoelectric machine has a divided housing and uses a liquid metal to effect variable resistance control of the machine current. The machine includes a stator comprising a housing having first and second portions and a field coil. The housing portions are electrically insulated from one another and together define a chamber having an axis that is coincident with the axis of the annular field coil. A rotor is journalled in the housing and a control member extends into a recess in the rotor. The rotor rotates about the control member and is spaced from the stator and from the control member. The spacing produces annular spaces into which a liquid metal may be forced by an expandable bellows arrangement. Current flow in the machine is through the control member, the space between the control member and the rotor, the rotor, the space between the rotor and the stator, and the stator. The amount of liquid metal in the annular spaces between the control member and rotor and between the rotor and stator determines the amount of current flow and the machine output characteristics.

7 Claims, 1 Drawing Figure

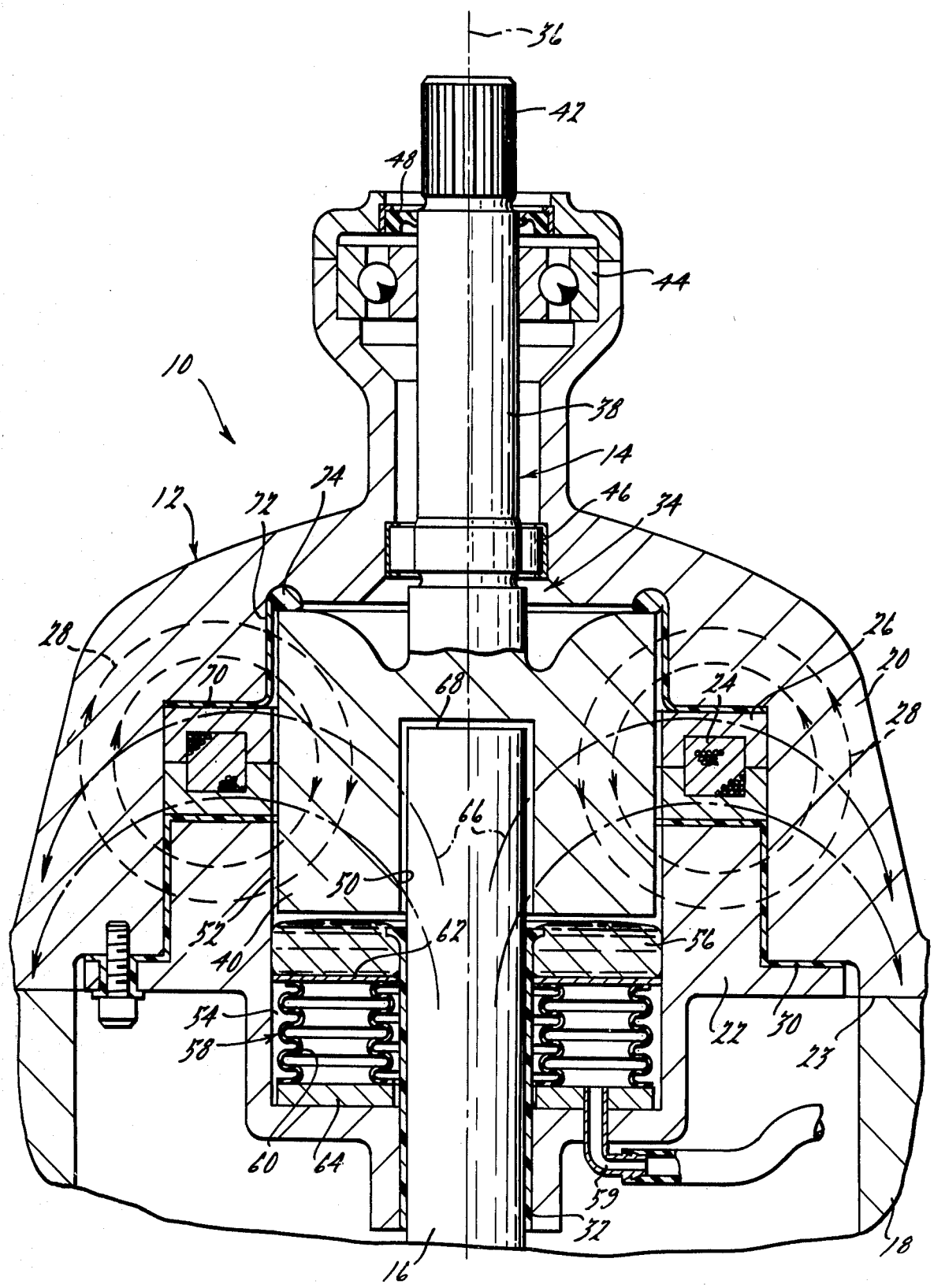

DIVIDED HOUSING UNIPOLAR DYNAMOELECTRIC MACHINE

BACKGROUND

This invention relates to a unipolar dynamoelectric machine having a divided housing and provided with variable resistance control of machine current. The invention is related to that described in the inventor's concurrently filed, commonly assigned patent application, Ser. No. 863,100 entitled, "A Unipolar Dynamoelectric Machine With variable Resistance Control". The unipolar machines described in this and the above-mentioned patent application are sometimes referred to as homopolar machines and may be used as either generators or motors.

Unipolar or homopolar dynamoelectric machines are low-voltage, high-current devices that offer high power density per unit volume or unit weight at high efficiency.

DESCRIPTION OF THE PRIOR ART

Unipolar motors have been known for many years and are described in U.S. Pat. Nos. 3,185,877 to A. Sears; 3,453,467 to L. M. Harvey; 3,917,235 to E. Massar and 3,984,715 to D. Kullmann et al. A unipolar or homopolar machine also is described in the publication: F. L. Zeisler, "A High Power Density Electric Machine Element," IEEE Transactions on Power Apparatus and Systems, Volume PAS-86, No. 7, pages 811-818, 1967. These patents and the publication describe unipolar machines having liquid metal contact between a rotor and stator, but none of these references teach a unipolar machine having a divided housing design as herein disclosed together with the variable resistance control technique hereinafter described.

SUMMARY OF THE INVENTION

The unipolar divided housing dynamoelectric machine of the invention provides machine current control using a variable resistance within the machine. Preferably, the variable resistance is produced by changing the amount of liquid metal electrical contact effected between a control member and the machine rotor as well as between the machine rotor and the stator. Electric motors, when used in electric vehicles or other traction applications, should produce a torque that decreases hyperbolically as a function of the vehicle speed. The unipolar machine of the invention, when used as a motor, generates a vortex in the liquid metal. The vortex generation tends to increase the machine resistance to current flow as a function of rotor angular velocity. This feature improves the efficiency of the machine.

The unipolar divided housing dynamoelectric machine of the invention includes a stator which has first and second housing portions and a field coil. The housing portions are electrically insulated from one another and together define a chamber having an axis. Each of the housing portions has an opening located on the axis. The field coil is annular in shape, concentric with the axis and positioned between the first and second housing portions. The housing portions are made from ferromagnetic and electrically conductive material.

A rotor is journalled in the first housing portion for rotation about the axis and includes a shaft extending from the chamber defined by the housing portions and through the opening in the first housing portion. The rotor has a portion within the chamber that is of a diameter greater than the diameter of the shaft. This rotor portion is made from a ferromagnetic and electrically conductive metal and has an axially extending recess. The rotor portion is radially spaced from the stator.

A control member is made from a material having some electrical resistance and extends from the exterior of the housing, through the opening in the second housing portion, and into the chamber and the recess in the rotor portion. The control member is electrically insulated from the second housing portion and is spaced from the rotor portion.

The dynamoelectric machine includes a cavity within the chamber. This cavity is formed between the second housing portion, the rotor portion and the control member. Annular spaces exist between the control member and the rotor portion and between the rotor portion and the stator. These annular spaces communicate with the cavity. A liquid metal is located within the cavity, and means are provided for forcing the liquid metal out of this cavity and into the annular spaces, thereby, to provide electrical contact between the control member and the rotor portion and between the rotor portion and the stator.

As the rotor of the unipolar machine rotates, with the liquid metal from the cavity located in the annular spaces, the amount of liquid metal in the radially outer annular space becomes greater than that in the radially inner annular space due to centrifugal force acting upon the liquid metal. This vortex-type phenomenon increases the resistance to current flow through the machine as a function of its rotor angular velocity.

The invention may be better understood by reference to the detailed description which follows and to the drawing.

BRIEF DESCRIPTION OF THE DRAWING

The drawing is a sectional elevational view of a unipolar divided housing dynamoelectric machine having liquid metal variable resistance control of machine current. The illustrated machine is particularly suitable for use as a motor and is herein described as such. The various components within the drawing are of circular or annular construction.

DETAILED DESCRIPTION

With reference now to the drawing, there is shown a sectional view of a unipolar dynamoelectric machine generally designated by the numeral 10. The machine 10 is described herein as a motor and includes a stator generally designated by the numeral 12 and a rotor generally designated by the numeral 14. Also provided is a control member 16 and an electrode or contact member 18. Control member 16 and contact member 18 may be directly coupled to the opposite polarity terminals of a low-voltage DC power supply, such as a heat engine or battery. The heat engine may be of the type using liquid sodium at different temperatures in regions separated by a membrane to produce an EMF. The preferred battery is a sodium-sulphur battery but others may be used to produce the low voltage required for the machine 10.

The stator 12 includes a first housing portion 20 and a second housing portion 22. The first housing portion 20 is in electrical contact at 23 with the electrode or contact member 18. The stator also includes an annular field coil 24 that is surrounded by a conductive copper jacket 26. Jacket 26 is formed from two identical annular members of channel-shaped cross-section. A tube (not shown) for conducting a liquid coolant may be provided within the jacket 26 if necessary in a given machine application. Of course, other well known cooling techniques can be employed to improve machine efficiency and durability.

The field coil 24 is helically wound and produces the magnetic field indicated by the dashed lines 28. The direction of the magnetic field may be as indicated by the arrows or lines 28 or opposite to such indication depending on the direction of current flow through the helical winding. The first housing portion 20 is made from a ferromagnetic and electrically conductive material, and the second housing portion 22 is also ferromagnetic and may, but need not be electrically conductive. Iron having the smallest amount of carbon possible is desirable for these components.

The first housing portion 20 is electrically insulated at 30 from the second housing portion 22. The second housing portion 22 is electrically insulated from the control member 16 at location 32. The insulation at locations 30 and 32 may be formed from annular plastic insulation materials, such as high-temperature polyimide or tetrafluoroethylene. The important factor in the choice of the insulation material is that it must be able to withstand the temperatures generated in the machine 10 as a result of resistive electrical losses produced during current flow through the machine.

The housing portions 20 and 22 together define a chamber 34 in which the rotor 14 is mounted for rotation. The axis 36 defined by the chamber 34 coincides or is concentric with the axis of the rotor 14.

The rotor 14 includes a shaft portion 38 and an enlarged diameter portion 40. As shown, the shaft portion 38 is vertically positioned, has a serrated output end 42 and is journalled for rotation within the stator 12 at bearing locations 44 and 46. Bearing 44 is a ball bearing and bearing 46 is a roller bearing as illustrated. A grease seal 48 is provided at the output end of the shaft 38. With reference to the drawing, the force of gravity should be regarded as acting in a downward direction.

The rotor 14 has connected to the shaft 38 an enlarged-diameter rotor portion 40 as previously mentioned. This enlarged diameter portion rotates within the chamber 34 and has a recess 50 within it of circular cross-section, which recess receives a portion of the control member 16. The rotor portion 40 rotates about the control member 40 and the annular spaced formed between the control member 16 and the rotor portion 40 is located radially inward with respect to an annular space 52 formed between rotor portion 40 and the stator 12.

An annular cavity 54 is formed between or defined by the control member 16, the housing portion 22 and the rotor portion 40. Within this cavity is located a liquid metal 56, which preferably is mercury. The cavity 54 in which the liquid metal 56 is located is in communication with the annular spaces 50 and 52. A force producing device 58 is located within the cavity 54 and comprises an axially movable bellows assembly. The bellows assembly 58 is of torodial shape, is hollow, and has a tubular inlet 59 for air or other fluid pressure to be introduced into the assembly. The bellows assembly has corrugated, preferably metal, walls 60 that are attached in sealing arrangement with upper and lower washer-shaped members 62 and 64. The tubular inlet 59 passes through an opening in the member 64, thereby, to provide communication with the interior of the bellows assembly. The member 64 is supported on the lower wall portion of the second housing portion 22. Upon the introduction of fluid pressure through the inlet 59 into the bellows assembly, the member 62 moves axially upward to force the liquid metal 56 within the cavity 54 into the radially separated annular spaces 50 and 52. Electrical contact thereby is formed between the control member 16 and the rotor portion 40 and between the rotor portion 40 and the stator 12.

Preferably, the copper jacket 26 has a highly conductive coating of nickel plate, flashed with rhodium, on its radially inner surface to improve wetting by the liquid metal and to minimize electrical resistance in the contact between it and the liquid metal 56 within the annular space 52. With the liquid metal in the annular spaces 50 and 52, the liquid metal in annular space 52 being in contact with the jacket 26, current flows as indicated by the dot-dash lines 66. This current interacts with the magnetic field 28 produced by current in the winding 24, thereby, to produce a torque acting upon the rotor 14 and causing it to rotate. As the velocity of the rotor 14 increases, the amount of liquid metal in the annular space 50 tends to decrease and that in the annular space 52 tends to increase due to the centrifugal force acting upon the liquid metal 56. The decrease in liquid metal in the annular space 50 tends to increase the resistance to current flow in the space or current path between the control member 16 and the rotor portion 40. This decreases the torque output of the motor 10 as a function of the rotor angular velocity.

The reduction in torque as a function of rotor angular velocity is a desirable feature for a motor of the type described when used in electrical vehicle traction applications. The decrease in liquid metal volume in the annular space 50 and its increase in the annular space 52 is a vortex effect that is due to the fact that the annular space 52 is located radially outward with respect to the annular space 50. The effect is analogous to that created in a glass of liquid that is stirred to produce a vortex, that is, a decrease occurs in the depth of the fluid at the center of the glass and an increase in level occurs at the radially outer areas.

With the level of the liquid metal 56 being as shown in the drawing, there is infinite resistance between the control member 16 and the contact member or electrode 18. If the bellows assembly 58 is expanded axially to force the liquid metal 56 into the annular spaces 50 and 52, an electrical path is provided once the liquid metal in the annular space 52 is made to extend vertically upward and into electrical contact with the jacket 26 surrounding the coil 24. If the liquid metal extends to the top of the annular passage 50 and contacts the upper end 68 of the control member and if this liquid metal also reaches the level corresponding to the upper surface 70 of the jacket 26, then the resistance between the control member 16 and the contact member 18 is a minimum. Also there is maximum current flow through the unipolar machine, and maximum torque is produced. With lesser contact between the liquid metal 56 and the control member 16 and jacket 26, reduced motor torque is produced. Increasing angular velocity of the rotor 14 tends to reduce the torque as previously described, but torque may be increased or decreased at will by control of the bellows assembly 58, which can be made to force the liquid metal 56 into the annular spaces 50 and 52 even through angular velocity of the rotor 14 may be increasing.

Electrical insulation 72 is provided in the upper portion of the chamber 34 and on the housing portion 20 to prevent current flow directly from the rotor portion 40 into the housing member 20 in this region. Also, if desired, a ferrofluidic seal or other sealing member 74 may be provided to prevent liquid metal in the passage 52 from being forced beyond the annular passage 52.

Based upon the foregoing description of the invention, what is claimed is:

1. A divided housing unipolar dynamoelectric machine with variable resistance control of machine current, said machine comprising:

a stator, said stator comprising first and second housing portions and a field coil, said first and second housing portions being electrically insulated from one another and together defining a chamber having an axis, each of said housing portions having an opening therein at locations on said axis, said field coil being annular in shape, concentric with said axis and positioned between said first and second housing portions, said housing portions being made from ferromagnetic and electrically conductive material;

a rotor journalled in said first housing portion for rotation about said axis, said rotor including a shaft extending from said chamber defined by said housing portions and through said opening in said first housing portion, said rotor having a portion within said chamber of diameter greater than the diameter of said shaft, said rotor portion being made from a ferromagnetic and electrically conductive material and having an axially extending recess, said rotor portion being spaced from said stator, thereby to form an annular space between them;

a control member made from a material having some electrical resistance, said control member extending from the exterior of said housing, through said opening in said second housing portion, and into said chamber and said recess in said rotor portion, said control member being electrically insulated from said second housing portion and spaced from said rotor portion, thereby, to form an annular space between said control member and said rotor portion;

said machine including a cavity in said chamber, said cavity being formed between said housing portion, said rotor portion and said control member, the annular spaces between said control member and said rotor portion and between said rotor portion and said stator communicating with said cavity;

a liquid metal within said cavity; and means for forcing said liquid metal out of said cavity and into said annular spaces, thereby, to provide electrical contact between said control member and said rotor portion and between said rotor portion and said stator.

2. A unipolar dynamoelectric machine as in claim 1, wherein the amount of liquid metal within said annular spaces is controllably variable by said forcing means.

3. A unipolar dynamoelectric machine as in claim 1, wherein said forcing means includes an axially movable member in engagement with said liquid metal, axial movement of said axially movable member causing axial flow of said liquid metal into said annular spaces.

4. A unipolar dynamoelectric machine as in claim 3, wherein said axial flow of said liquid metal is in a substantially vertical direction and against the force of gravity.

5. A unipolar dynamolectric machine as in claim 2, wherein the amount of liquid metal within said annular spaces varies as a function of the angular velocity of said rotor.

6. A unipolar dynamoelectric machine as in claim 4, wherein the amount of liquid metal within said annular spaces varies as a function of the angular velocity of said rotor.

7. A unipolar dynamoelectric machine as in claim 6, wherein said forcing means comprises a bellows assembly having an axially movable member acting against said liquid metal in response to a fluid pressure within said bellows assembly.

* * * * *